Patented Apr. 4, 1950

2,502,498

UNITED STATES PATENT OFFICE 2,502,498

LIGNOCELLULOSE, PHENOL FORMALDE-HYDE, AND INORGANIC FILLER MOLDING COMPOSITION

Robert V. Williamson and Thomas F. Clark, Peoria, Ill., assignors to United States of America as represented by the Secretary of Agriculture No Drawing. Application October 18, 1946, Serial No. 703,978

7 Claims. (Cl. 260—17.2)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to thermosetting plastic molding compositions of the phenol-formaldehyde type. The general objective of this invention is the provision of such compositions which contain smaller amounts of phenol-formaldehyde, or other thermosetting resins than that used in the prior art but still possess the properties of high-grade, general-purpose molding compounds.

It is generally understood in the prior art that a molding composition, which is composed of fluffy, dry, lignocellulose flour, such as wood flour, and phenol-formaldehyde resin, requires about 50 percent of resin in order to lubricate properly the mixture so that it will have sufficient flow in the mold during the molding operation. If the phenol-formaldehyde is materially reduced and replaced by additional lignocellulose flour, inferior physical properties such as water absorption, flexural and tensile strengths, and flow in the mold are obtained. Material other than lignocellulose flour, therefore, must be added to replace the reduced resin content. These materials should be nonvolatile to prevent changes on aging and low in water solubility to keep water absorption at a minimum, and they should act as a lubricant to improve flow in the mold, and form a strong bond with the resin and other materials in the compound when it is molded into a finished article.

We have discovered that certain inorganic materials meet these requirements and may be used as extenders to replace the reduced resin content in compounds with low phenol-formaldehyde resin and to produce compounds with properties comparable to general-purpose compounds with the normal resin content of 47 to 50 percent.

We may use various lignocellulose materials, such as rice hulls, wheat straw, flax shives, corncobs, peanut shells, hemp hurds, or other agricultural residues, or wood flour as the fibrous component in the compounds.

The technique of producing these compounds is the same as that used in commercial practice, namely, mixing materials in a dough mixer or other mechanical mixer, rolling the mixed materials on heated differential rolls to compact the materials and to advance the degree of polymerization of the resin, and grinding the rolled sheets to a powder ready for molding.

The following examples show the physical properties of molded specimens from different lignocellulose compounds with the following general composition. The compounds in all of the examples given were molded at 350° F. and 3,000 p. s. i. Composition: fifty percent of lignocellulose flour, 25 percent of phenolic resin, 22.5 percent of precipitated chalk inorganic extender, 2.0 percent of dye, and 0.5 percent of zinc stearate as lubricant.

*Table 1.—Physical properties*

| Lignocellulose Flour | Flexural strength | Tensile strength | Izod notched impact strength | Water absorption gain in weight |
|---|---|---|---|---|
| | *P. s. i.* | *P. s. i.* | *Ft.-lb./inch of notch* | *Percent* |
| Specifications for general-purpose wood flour phenolics | 9,000 | 7,000 | 0.24 | 0.80 |
| Example I—Rice hull | 10,800 | 7,140 | 0.26 | 0.43 |
| Example II—Flax shive | 9,370 | 7,950 | 0.21 | 0.79 |
| Example III—Peanut shell | 9,290 | 7,180 | 0.20 | 0.69 |
| Example IV—Hemp hurd | 9,160 | 8,250 | 0.25 | 0.54 |
| Example V—Wheat straw | 9,940 | 7,400 | 0.21 | 1.06 |
| Example VI—Corncob | 12,300 | 9,400 | 0.22 | 1.44 |

Examples I to VI inclusive, all contained black dye for the purpose of producing black molded specimens. If the natural walnut-brown color of the compounds is satisfactory, the dye may be omitted and replaced by additional inorganic extenders, such as precipitated chalk, diatomaceous earth, or other inorganic extenders which have very little effect on the natural color of the compounds. The zinc stearate lubricant may also be omitted in these inorganic extended compounds without trouble from sticking of the molded specimens in the mold.

The following examples show the physical properties of molded specimens from different lignocellulose compounds in which the dye and lubricant have been omitted. The general composition of these compounds was as follows: fifty percent of lignocellulose material, 25 percent of phenolic resin, and 25 percent of an inorganic extender.

erties of molded specimens which contained precipitated chalk and iron oxide as the inorganic extender and different agricultural residue flours as the lignocellulose component. The general composition of these compounds was the same Table 2.—Physical properties

| Lignocellulose material | Extender | Flexural strength | Tensile strength | Izod notched impact strength | Water absorption gain in weight |
|---|---|---|---|---|---|
| | | P. s. i. | P. s. i. | Ft.-lb./inch of notch | Percent |
| Example VII—Hemp hurd flour | Precipitated chalk | 9,730 | 7,250 | 0.23 | 0.68 |
| Example VIII—Wood flour | do | 9,200 | 7,800 | 0.26 | 0.52 |
| Example IX—Boiled corncob fiber | do | 9,390 | 7,890 | 0.26 | 1.54 |
| Example X—Corncob flour | Diatomaceous earth | 13,510 | 9,320 | 0.21 | 1.57 |

Examples VII to IX, inclusive, contained precipitated chalk as the inorganic extender. Example X contained a processed diatomaceous extender which is commonly used as a filter aid and is marketed under the trade name "Dicalite Speed-flow."

Lighter colored compounds ranging from tan to ivory may be made by replacing all or part of the precipitated chalk, diatomaceous earth, or other inorganic extenders of low coloring power with white pigments of high coloring power, such as titanium dioxide. The following examples show the physical properties of compounds in which the precipitated chalk has been partially or entirely replaced with titanium dioxide. The general composition of these compounds was that shown for Table 2, i. e., 50 percent of lignocellulose material, 25 percent of phenolic resin, and 25 percent of inorganic extender.

as that in Tables 2 and 3, i. e., 50 percent of lignocellulose material, 25 percent of phenolic resin, and 25 percent inorganic extender.

Table 3.—Physical properties

| Lignocellulose material | Inorganic extender | Flexural strength | Tensile strength | Izod notched impact strength | Water absorption gain in weight |
|---|---|---|---|---|---|
| | Percent | P. s. i. | P. s. i. | Ft.-lb./inch of notch | Percent |
| Example XI—Boiled corncob fiber | Precipitated chalk, 15 and titanium dioxide, 10. | 9,560 | 8,810 | 0.29 | 1.37 |
| Example XII—Boiled corncob fiber | Titanium dioxide, 25 | 10,470 | 9,320 | 0.24 | 1.34 |
| Example XIII—Hemp hurd flour | Precipitated chalk, 15 and titanium dioxide, 10. | 10,840 | 8,350 | 0.26 | 0.57 |

A comparison of Example IX in Table 2, which is a compound prepared from corncobs which were boiled in water and ground wet and precipitated chalk extender, with Examples XI and XII in Table 3, which were prepared with the same lignocellulose material but which had part or all of the precipitated chalk replaced with titanium dioxide, shows that titanium dioxide produces improved strength properties. The improved strength properties produced by the addition of the titanium dioxide is also shown by comparison of Example VII in Table 2 and Example XIII in Table 3.

Red compounds may be prepared by replacing part of the inorganic extender with iron oxide. The following examples show the physical prop- A comparison of the results in Table 4 with those in Table 1 for the same lignocellulose compounds shows that the properties of the compounds in Table 4, where the precipitated chalk had been partially replaced by iron oxide, were improved in all cases, except for water absorption of the flax shive compound, Example XVI. The flow properties in the mold of all of these compounds were good, but the partial replacement of precipitated chalk extender with iron oxide produced compounds with still better flow properties. A measure of the flow properties of these compounds is given by the time of mold closure for molding a cup 2½ inches in height and 2 inches in diameter. The time of closure, when an electronically preheated pellet was Table 4.—Physical properties

| Lignocellulose material | Inorganic extender | Flexural strength | Tensile strength | Izod notched impact strength | Water absorption gain in weight |
|---|---|---|---|---|---|
| | Percent | P. s. i. | P. s. i. | Ft.-lb./inch of notch | Percent |
| Example XIV—Corncob flour | Precipitated chalk, 15 and iron oxide, 10 | 13,750 | 9,600 | 0.23 | 1.14 |
| Example XV—Wheat straw flour | Precipitated chalk, 15 and iron oxide, 10 | 9,680 | 7,730 | 0.24 | 0.89 |
| Example XVI—Flax shive flour | Precipitated chalk, 15 and iron oxide, 10 | 10,480 | 8,640 | 0.24 | 1.05 | used, was only 3 seconds longer than the time of closure for the empty mold.

While all of the results presented are for compounds with the general composition of 50 percent, lignocellulose material; 25 percent, phenolic resin; and 22.5 to 25 percent, inorganic extender, we do not wish to be limited to these particular proportions of materials, nor to these particular materials. These examples have been presented to show that the expensive phenolic resin may be reduced to approximately one-half the amount normally used in the prior art, and that by the combination of inexpensive finely ground or powdered inorganic extenders and the normal amount of lignocellulose flour or fiber, compounds can be produced with molding and physical properties comparable with those of the compounds with higher resin content used in the prior art. The examples show further that various inorganic extenders or combination of extenders produce specific properties when combined with different lignocellulose materials and resins.

Whereas in the prior art, wood flour has been the lignocellulose material commonly used, these examples show that a wide variety of agricultural residues may be used to produce results equally as good or better than those obtained with wood flour.

Having thus described our invention, we claim:

1. A thermosetting molding composition comprising about 50 percent lignocellulose, about 25 percent phenol-formaldehyde resin, and about 22.5 to 25 percent precipitated chalk.

2. A thermosetting molding composition comprising about 50 percent lignocellulose, about 25 percent phenol-formaldehyde resin, and about 22.5 to 25 percent of inorganic extender, the inorganic extender being a mixture of precipitated chalk and titanium dioxide.

3. A product prepared by molding, under heat and pressure, the composition described in claim 1.

4. A product prepared by molding, under heat and pressure, the composition described in claim 2 in which the inorganic extender is precipitated chalk in major amount and titanium dioxide in minor amount.

5. A thermosetting molding composition essentially consisting of phenol-formaldehyde resin, lignocellulose and about 22.5 to 25 percent of an inorganic extender, less than 47 percent of the sum of the lignocellulose, inorganic extender, and phenol-formaldehyde resin content being phenol-formaldehyde resin, the sum of the inorganic extender and phenol-formaldehyde resin content being no more than 50 percent of the sum of the lignocellulose, inorganic extender, and phenol-formaldehyde resin content, the inorganic extender being taken from the group consisting of precipitated chalk, diatomaceous earth, titanium dioxide, and a mixture of a member of the group consisting of precipitated chalk and diatomaceous earth with a member of the group consisting of titanium dioxide and iron oxide.

6. A thermosetting molding composition comprising about 50 percent lignocellulose, about 25 percent phenol-formaldehyde resin, and about 22.5 to 25 percent inorganic extender taken from the group consisting of precipitated chalk, diatomaceous earth, titanium dioxide, and a mixture of a member of the group consisting of precipitated chalk and diatomaceous earth with a member of the group consisting of titanium dioxide and iron oxide.

7. The product prepared by molding, under heat and pressure, the thermosetting molding composition comprising about 50 percent lignocellulose, about 25 percent phenol-formaldehyde resin, and about 22.5 to 25 percent diatomaceous earth.

ROBERT V. WILLIAMSON.
THOMAS F. CLARK.

REFERENCES CITED

The following references are of record in the file of this patent:

UNITED STATES PATENTS

| Number | Name | Date |
| --- | --- | --- |
| 1,077,113 | Aylsworth | Oct. 28, 1913 |
| 2,280,934 | Seebach | Apr. 28, 1942 |
| 2,337,523 | Lum | Dec. 21, 1943 |
| 2,433,417 | Bitting | Dec. 30, 1947 |

FOREIGN PATENTS

| Number | Country | Date |
| --- | --- | --- |
| 385,062 | Great Britain | Dec. 22, 1932 |
| 562,590 | Great Britain | Oct. 10, 1944 |

OTHER REFERENCES

Mattiello: Protective and Decorative Coatings, vol. II, pages 440–411, 470, 472, John Wiley, New York.

Clark: Modern Plastics, Oct. 1945, pages 158–160, 214, 216, 218.

Williamson: Modern Plastics, February 1946, pages 177–180, 220, 222.

Chem. and Met. Engineering, September 1944, pages 157–158.